4,354,275

United States Patent [19]

Bouyssounouse et al.

[11] 4,354,275

[45] * Oct. 12, 1982

[54] APPARATUS FOR COMMUNICATING RECEIPT OF TRANSMITTED MESSAGES

[76] Inventors: Bernard Bouyssounouse; Chantal Bouyssounouse, both of 840 Hamilton Ave., Palo Alto, Calif. 94301

[ * ] Notice: The portion of the term of this patent subsequent to Jul. 24, 1996, has been disclaimed.

[21] Appl. No.: 40,639

[22] Filed: May 21, 1979

Related U.S. Application Data

[63] Continuation of Ser. No. 896,314, Apr. 14, 1978, Pat. No. 4,162,449.

[51] Int. Cl.[3] .............................................. H04B 1/00

[52] U.S. Cl. ........................................ 455/54; 455/18; 340/539

[58] Field of Search ....................... 455/18, 11, 54, 56; 340/311-314, 539

[56] References Cited

U.S. PATENT DOCUMENTS 3,290,597 12/1966 Denny et al. ........................ 455/18
3,699,443 10/1972 Weger ................................. 455/18
3,723,876 3/1973 Seaborn, Jr. .......................... 455/18
3,914,692 10/1975 Seaborn, Jr. .......................... 455/54
4,107,611 8/1978 Holcomb et al. ...................... 455/18
4,197,497 4/1980 Phelps ................................. 455/18

*Primary Examiner*—Jin F. Ng
*Attorney, Agent, or Firm*—Roland I. Griffin

[57] ABSTRACT

An apparatus is provided for communicating to a transmitter or sender of an emergency message a response indicating that the message was received. The communicating apparatus operates in conjunction with a portable alarm unit carried by the sender, a continuous-loop magnetic tape recorder-player, and a local CB radio (i.e., a CB radio located within the range of the portable alarm unit). In response to a signal from the portable alarm unit, the apparatus activates the communicating recorder-player causing it to play a pre-recorded emergency message and to apply this message, in the form of a message signal, to the local CB radio. The local CB radio transmits the message to a listener at a remote CB radio station. In response to a selected acknowledgement message received from a listener via the local CB radio, the communicating apparatus detects the acknowledgement message and transmits a signal to the portable alarm unit indicating receipt by a listener of the emergency message. The communicating apparatus includes a transceiver, a power supply unit, an interface unit, and a listening circuit.

7 Claims, 9 Drawing Figures

APPARATUS FOR COMMUNICATING RECEIPT OF TRANSMITTED MESSAGES

CROSS REFERENCE TO RELATED APPLICATION

This is a continuation of U.S. patent application Ser. No. 896,314 filed on Apr. 14, 1978, and issued as U.S. Pat. No. 4,162,449 on July 24, 1979.

BACKGROUND OF THE INVENTION

Various emergency communication systems have been developed for use by publilc service organizations, such as the police and fire departments, and for use by private security organizations in guarding industrial sites, plants, hospitals and other buildings. One such system, entitled "Emergency Communication System", is described, for example, in U.S. Pat. No. 3,914,692 issued to George C. Seaborn, Jr. on Oct. 21, 1975, and entitled EMERGENCY COMMUNICATION SYSTEM. The system includes a portable transmitter-receiver unit which is carried by an individual for transmitting an emergency message and for notifying the individual of receipt of the transmitted message at a remote station. Typically in such a system, the emergency message transmitted by the portable unit is received at a local station (e.g., a two-way radio station located nearby) and relayed or transmitted from the local station (via radio or telephone link) to a remote station or central office. A radio receiver or modem at the remote station receives the relayed message and forwards this message to a nearby computer which logs or prints the message for human perusal and action. The computer then sends to the local station, via the telephone link or via a radio transmitter, an acknowledgement (ACK) message verifying receipt of the emergency message. The local station transmits the ACK message to the portable unit, which activates an indicator notifying the individual that the emergency message has been received at the remote station.

Although such systems provide for transmission of emergency messages from a device on the person and for notifying the person of receipt of the transmitted messages at a remote station, their use is often limited to businesses and public and private security organizations which require and can afford such elaborate communications equipment (i.e., equipment responsive to computer-generated acknowledgement signals from the remote stations). To the average individual, however, such systems are often too costly and too elaborate to be acquired mainly for signalling (from one's person) an emergency condition and obtaining notification of receipt of the signalled condition. What would be useful to a larger segment of the population (viz., to individuals in addition to businesses and public and private security organizations), therefore, is an inexpensive, emergency communication system that could be added-on, without modification and without the requirement of FCC (Federal Communications Commission) approval, to existing two-way radio systems such as CB (citizen's band) vehicular radio systems. One such add-on type system is described, for example, in U.S. Pat. No. 3,723,876 issued Mar. 27, 1973 to George C. Seaborn, Jr. and entitled EMERGENCY DISTRESS SIGNALING SYSTEM. However, a fundamental deficiency of such a system is that, although it provides the economical add-on feature, it does not provide individuals with a means of obtaining notification of receipt of their transmitted messages.

What is needed, therefore, is an emergency communication system that could be added to a conventional two-way radio system such as a CB radio system, and that could notify an individual (via a portable transmitter-receiver unit carried by the individual) of receipt of emergency messages transmitted by the individual. The added system should not require modification of the CB radio system and, hence, should not require FCC approval. Furthermore, to provide greater flexibility of use, the system should enable the user (transmitter) to select the method for acknowledging receipt of the messages, rather than being responsive only to computer-generated acknowledgement signals.

SUMMARY OF THE INVENTION

In accordance with the illustrated preferred embodiment of the present invention, a communicating apparatus is provided comprising a transceiver, a power supply unit, an interface unit, and a listening circuit. The communicating apparatus operates in conjunction with a portable alarm unit carried by an individual, a continuous-loop magnetic tape recorder-player unit (e.g., a cassette or cartridge recorder-player unit), and a local CB radio.

In the event of an emergency, the individual activates the portable alarm unit to transmit a signal to the transceiver. In response to the signal from the portable alarm unit, the transceiver activates the power supply unit which applies power to the local CB radio, to the listening circuit, and to the tape recorder-player via the interface unit. The applied power causes the tape recorder-player to play a pre-recorded emergency message and to apply this message, in the form of a message signal, to the local CB radio. The local CB radio transmits the emergency message to a listener at a remote CB radio station. In response to receipt by the local CB radio of an acknowledgement message from a listener (e.g., a particular acknowledgement message or method of response stated by the individual in his emergency message), the listening circuit detects the acknowledgement message, and transmits a signal, via the transceiver, to the portable alarm unit indicating receipt by a listener of the emergency message. Upon detection of the acknowledgement message, the listening circuit also applies a signal to the power supply unit to turn-off power to certain elements of the communicating apparatus, thereby conserving power (energy).

DESCRIPTION OF THE PREFERRED EMBODIMENT

Figure 1:
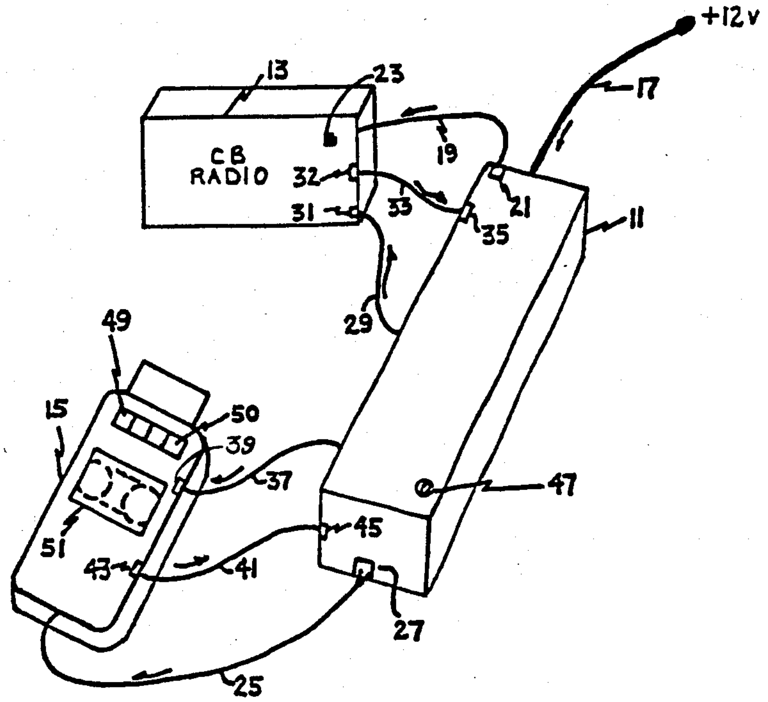
FIG. 1 is a perspective view of a communicating apparatus according to the preferred embodiment of the present invention linked to a magnetic tape recorder-player and to a CB radio.

Referring to FIG. 1, there is shown communicating apparatus 11 according to the preferred embodiment of the present invention. The communicating apparatus 11 may be carried by an individual in his car or may be kept by the individual in a building or at some other convenient location. The communicating apparatus 11 is designed to be used in conjunction with a CB radio 13 and with a magnetic tape recorder-player such as a continuous tape (e.g., 2-minute tape) cassette recorder-player 15. To apply power to communicating apparatus 11, a lead 17 of apparatus 11 may be inserted into a cigarette lighter well (not shown) of an automobile. (If lead 17 has a male-plug type terminus, it may be inserted into a standard 110-volt outlet in a building.) Power is relayed from communicating apparatus 11 to CB radio 13 via lead 19, and to recorder-player 15 via lead 25. To energize CB radio 13, lead 19 of the CB radio is inserted into power outlet 21 of communicating apparatus 11, and switch 23 is flipped (set) "ON". To energize recorder-player 15, lead 25 of the recorder-player is inserted into power outlet 27 of communicating apparatus 11. To permit the transfer of information (i.e., the propagation of message signals) between communicating apparatus 11 and CB radio 13, lead 29 of the apparatus is connected to inlet 31 of the CB radio, and lead 33 of the CB radio is connected to inlet 35 of the apparatus. Also, to permit the transfer of information between communicating apparatus 11 and recorder-player 15, lead 37 of the apparatus is coupled to inlet (microphone input) 39 of the recorder-player, and lead 41 is coupled from outlet (earphone plug outlet) 43 of the recorder-player to inlet 45 of the communicating apparatus. After power is applied to recorder-player 15 through communicating apparatus 11, switch (button) 47 of apparatus 11 is activated to apply to recorder-player 15, via lead 37, a tone or signal (e.g., a greater than 2-minute signal). Record key 49 of the recorder-player is then depressed, causing the applied tone to be recorded throughout the length of the tape on cassette 51 of the recorder-player. Recording of the tone is then terminated and lead 37 is disconnected from the recorder-player 15. Thereafter, the user depresses record key 49 again, and records a desired emergency message. The emergency message (which may include name, location, the emergency condition, sex, age, clothing and other physical-characteristics information) should not be longer than the length or duration of the tone signal recorded on the tape (e.g., the recorded emergency message should have a duration of less than two minutes). After recording the emergency message, the user depresses the play key 50 to place the recorder-player in "play mode" so that when power is later applied to the recorder-player, the recorded message will be played.

Figure 2:
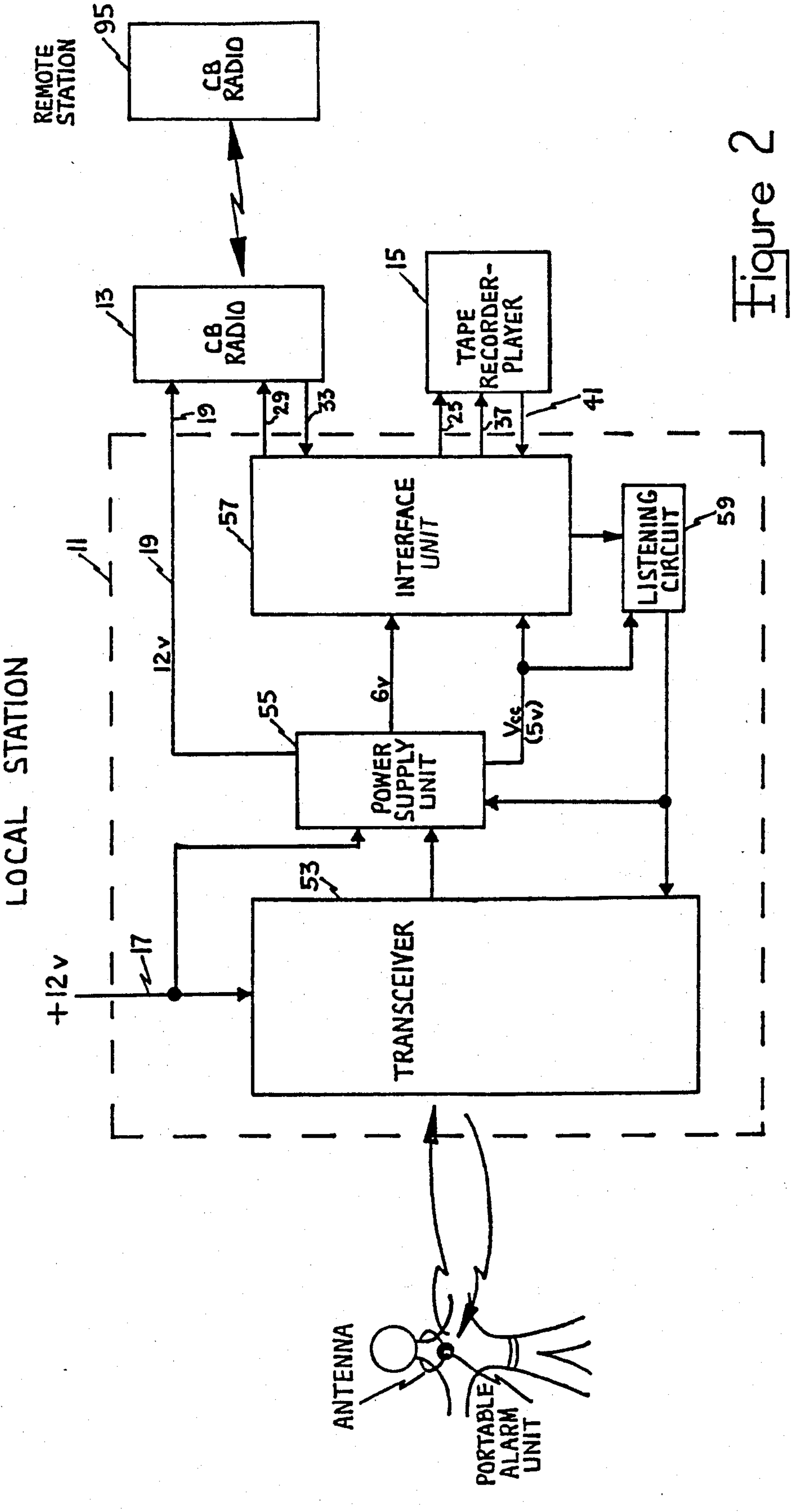
FIG. 2 is a block diagram of the communicating apparatus, CB radio and recorder-player of FIG. 1 shown as a local station interacting with a portable alarm unit and with a remote-station CB radio.

As shown in FIG. 2, the communicating apparatus 11 includes a transceiver 53, a DC power supply unit 55, an interface unit 57, and a listening circuit 59. Upon the occurrence of an emergency condition such as an assault upon a person or the onset of a medical problem requiring emergency medical assistance, the person wearing a portable alarm unit (e.g., a portable unit as shown and described in U.S. Pat. No. 3,914,692) activates a switch or button on the unit to summon help. Upon the activation of the button (not shown), a signal is transmitted from the unit to transceiver 53 of communicating apparatus 11.

Figure 3:
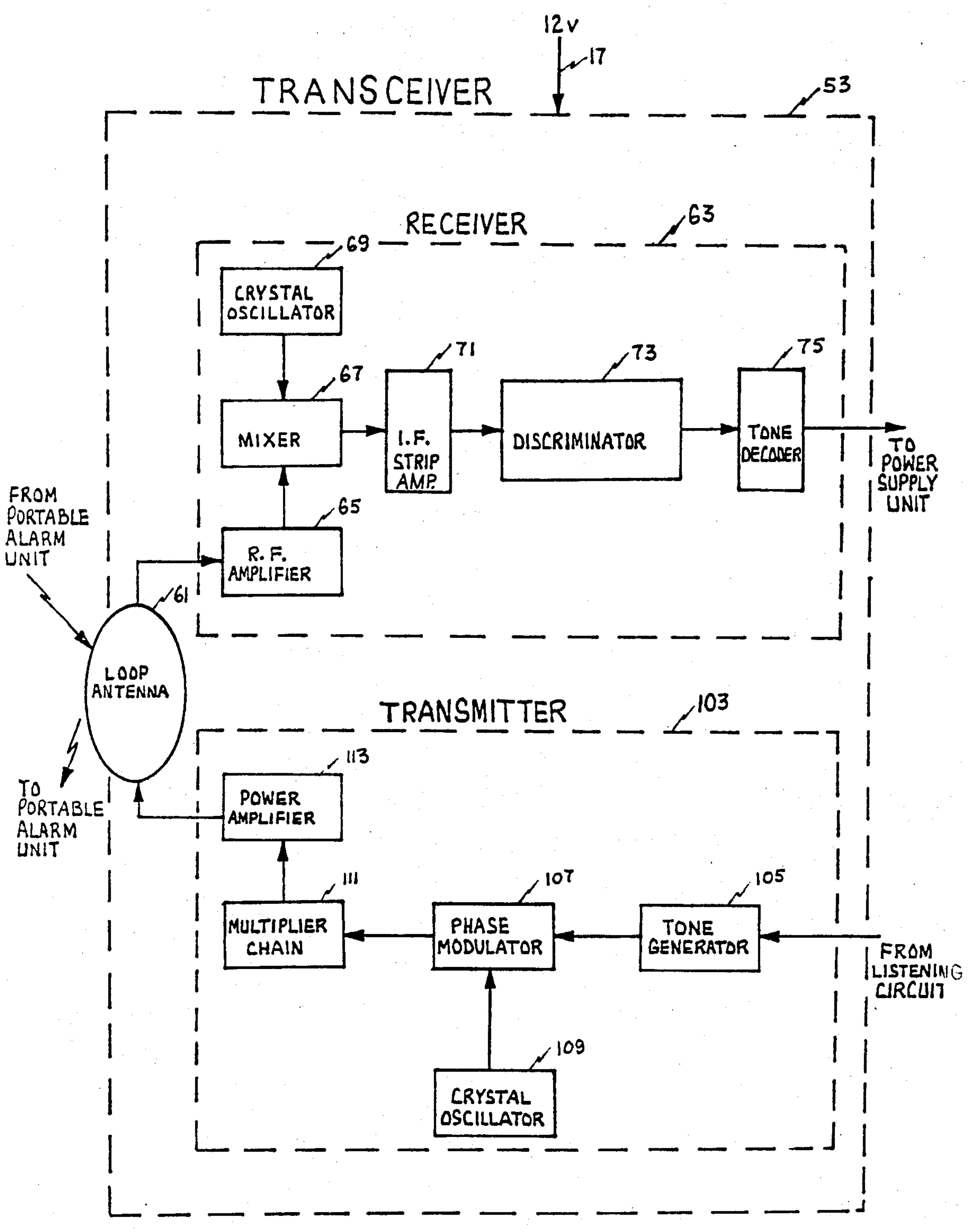
FIG. 3 is a block diagram of the transceiver included in the communicating apparatus of FIGS. 1 and 2.

As shown in FIG. 3, the signal from the portable alarm unit is received, via loop antenna 61, at the receiver portion 63 of transceiver 53. Receiver 63 includes R.F. (radio frequency) amplifier 65, mixer 67, crystal oscillator 69, I.F. (intermediate frequency) strip amplifier 71, discriminator 73, and tone decoder 75. In response to the signal received via loop antenna 61, R.F. amplifier 65 amplifies the received signal to a selected level and applies the amplified signal to mixer 67 where it is mixed with (added to or subtracted from) a reference signal from oscillator 69 (the reference signal having a selected frequency) to produce an intermediate frequency (IF) signal. This IF signal from mixer 67 is then applied to I.F. strip amplifier 71 where it is amplified and applied to discriminator 73. Discriminator 73 converts frequency or phase variations in the applied signal to amplitude variations and applies the converted signal to tone decoder 75. In response to the applied converted signal, tone decoder 75 applies an activating signal to power supply unit 55.

Figure 4:
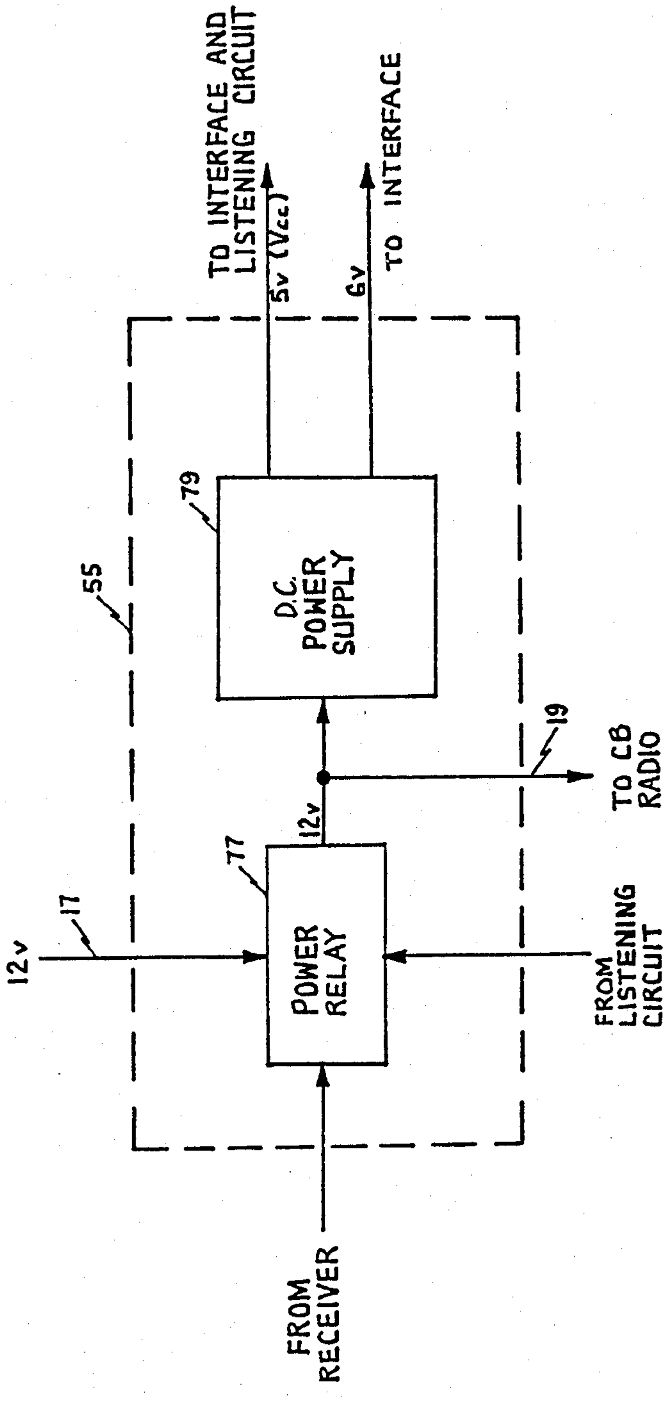
FIG. 4 is a block diagram of a power supply unit included in the communicating apparatus of FIGS. 1 and 2.

As shown in FIGS. 2 and 4, power supply unit 55 comprises a power relay unit 77 and a DC power supply 79. In response to the applied converted signal from tone decoder 75 of receiver 63, power relay unit 77 applies a DC voltage (12 volts) to CB radio 13 and to power supply 79. In response to the applied DC voltage, power supply 79 produces a $V_{cc}$ voltage (5 volts) and applies this voltage to interface unit 57 and to listening circuit 59. Power supply 79 also applies a selected voltage (6 volts) to interface unit 57.

Figure 5:
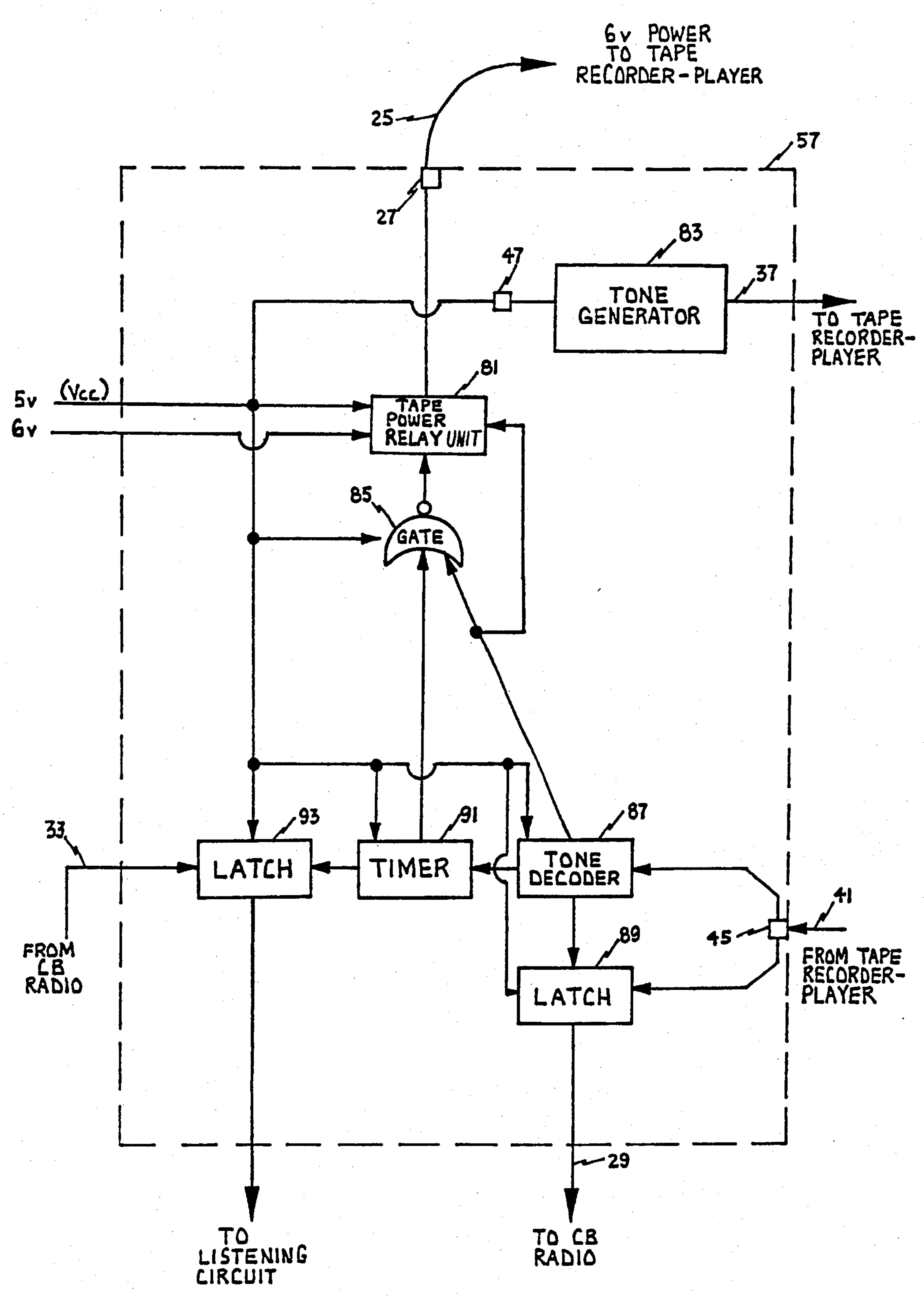
FIG. 5 is a block diagram of an interface unit included in the communicating apparatus of FIGS. 1 and 2.

FIG. 5 shows interface unit 57 to include a tape power relay unit 81, a tone generator 83, a NOR gate 85, a tone decoder 87, a first latch circuit 89, a timer 91, and a second latch circuit 93. In response to the ($V_{cc}$) voltage applied from power supply 79 of power supply unit 55, and in response to actuation of switch 47 as indicated hereinbefore, tone generator 83 applies a tone (via lead 37) to recorder-player 15 which records the tone on tape when switch 49 (FIG. 1) is depressed. Thereafter, the user disconnects lead 37, depresses switch 49 again to record the emergency message on the tape, and then depresses switch 50 to place the recorder-player in play mode. Also in response to the ($V_{cc}$) voltage and to the selected and to a voltage (6 volts) applied from power supply 79 of power supply unit 55, tape power relay unit 81 relays the selected voltage (6 volts) to recorder-player 15, via lead 25. Because switch 50 was previously depressed, the relayed selected voltage (6 volts) causes the recorder-player to play the recorded message.

As shown in FIGS. 1, 2 and 5, the selected 6-volt voltage applied from interface unit 57 to tape recorder-player 15 "turns-on" the recorder-player causing it to play the recorded emergency message and the recorded tone and to apply to CB radio 13 (via lead 41, latch 89 and lead 29) a signal representing the emergency message or tone. The CB radio 13, being in transmit mode, transmits the emergency message to a listener at a remote CB radio 95 (FIG. 2). Transmission occurs until the tone signal is received by tone decoder 87.

Figure 6:
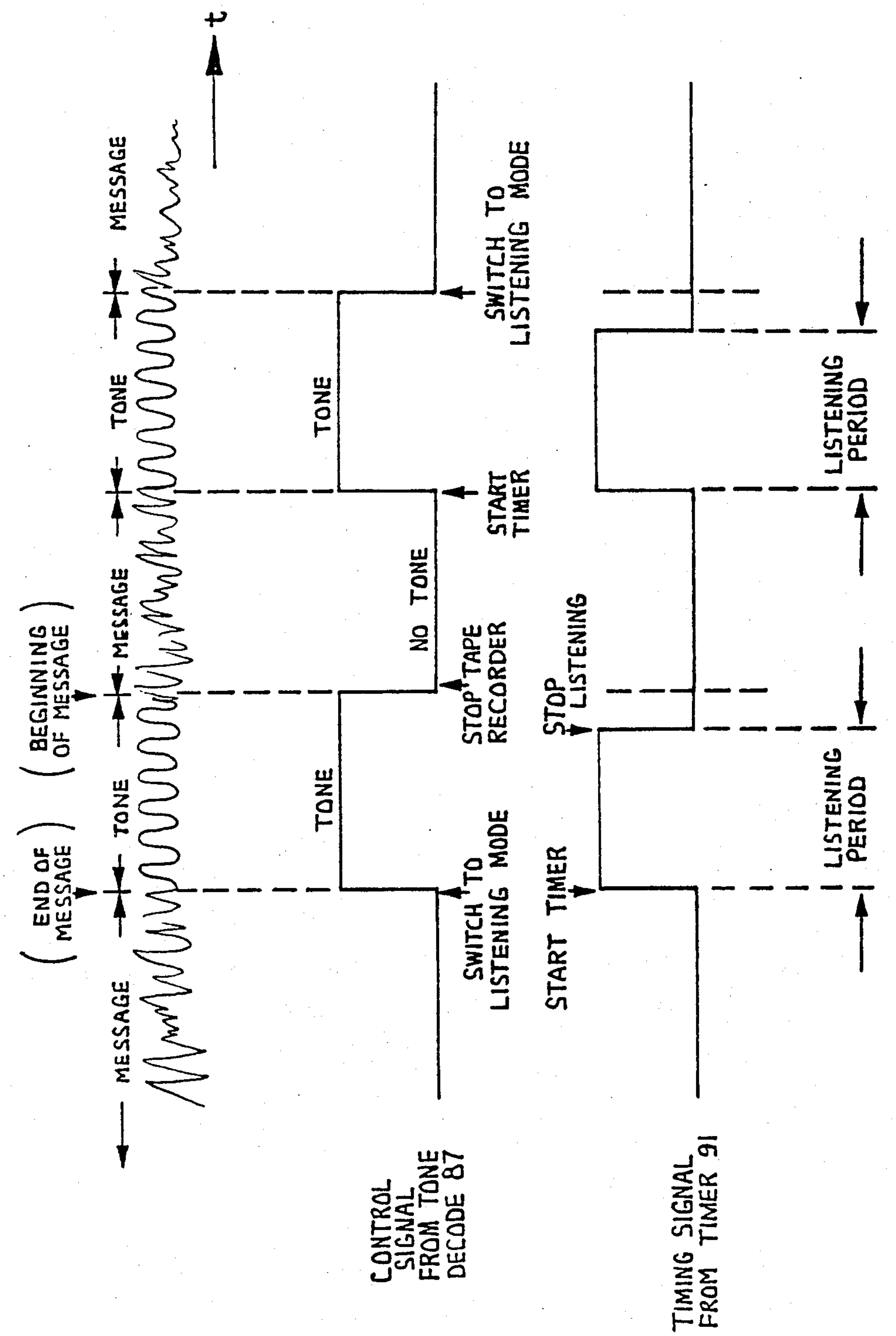
FIG. 6 is a waveform diagram showing selected signals produced by selected elements of the interface unit of FIG. 5.

As shown in FIGS. 2, 5 and 6, in response to receiving a tone signal from recorder-player 15 (the tone signal indicating an end-of-message condition), tone decoder 87 applies a control signal (a high) to latch 89, to timer 91, to gate 85, and to tape power relay unit 81. In response to the control signal from tone decoder 87, latch 89 opens and prevents passage of tone signals to CB radio 13. This prevents transmission of tone signals by the CB radio 13.

In response to the control signal from tone decoder 87, timer 91 defines a listening period by applying a timing signal (a high) to latch 93 and to gate 85 (the listening period being defined as the time it takes timer 91 to count down to zero from a predetermined value). The timing signal applied to latch 93 causes latch 93 to close and to relay to listening circuit 59 a message received by CB radio 13, the message having been transmitted by the listener from remote CB radio 95. The message transmitted by the listener is received by the receiver of the CB radio 13 and relayed to latch 93 via lead 33 coupled to output terminal 32 (FIG. 1) of the receiver (e.g., coupled to terminals 2 and 5 of a microphone input plug of a standard CB radio). To transmit a message to a listener, latch 89 couples lead 29 to input terminal 31 (FIG. 1) of the transmitter of CB radio 13 (e.g., lead 29 may be coupled to terminals 3 and 4 of the microphone input plug, terminal 1 being coupled to ground).

In response to transition from a high (tone) to a low (no tone) of the control signal from tone decoder 87, tape power relay unit 81 turns off power (i.e., does not apply the selected 6-volt voltage) to recorder-player 15 causing the recorder-player to stop playing and the tape on cassette 51 to be positioned at the beginning of the message. In response to a low signal from timer 91 (indicating that the listening period has elapsed, and in response to a low signal from tone decoder 87 (indicating that the end of the tone and beginning of the message has been reached on the tape), NOR gate 85 applies a high signal to tape power relay unit 81 causing the relay unit to apply power to recorder-player 15, thereby replaying the recorded message.

The user specifies in the recorded emergency message the particular manner in which receipt of the message is to be acknowledged by the CB listener. For example, he may specify that between short periods of silence, the word "check" should be spoken and transmitted by the listener indicating (acknowledging) that he has received the emergency message and will be sending help or will be notifying another person to send help. As shown in FIGS. 2 and 5, the acknowledgement message signal ("check") transmitted by the user from CB radio 95 is received by the receiver portion of CB radio 13 and relayed via latch 93 of interface 57 to listening circuit 59.

Figure 7:
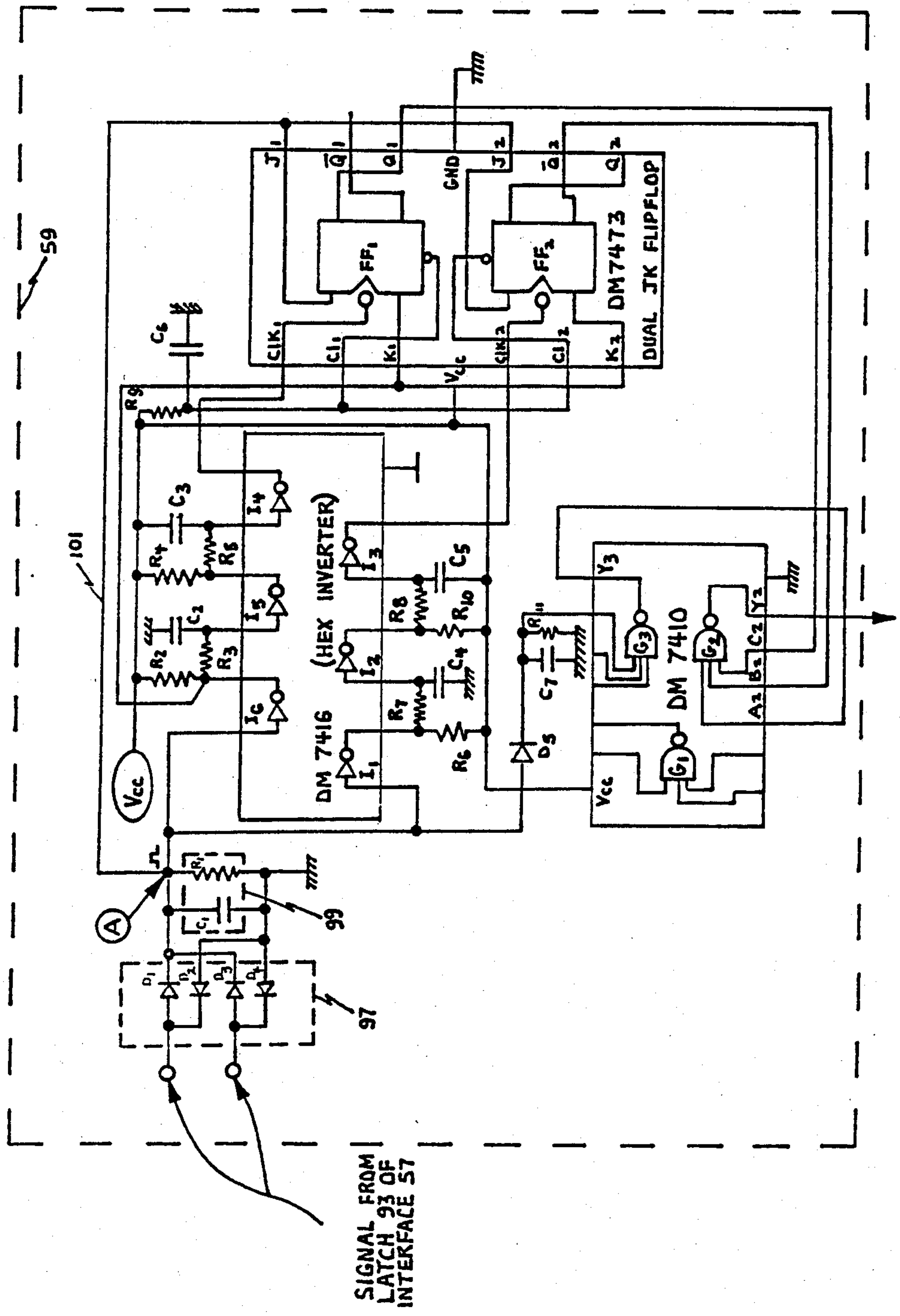
FIG. 7 is a schematic diagram of a listening circuit included in the communicating apparatus of FIGS. 1 and 2.
Figure 8:
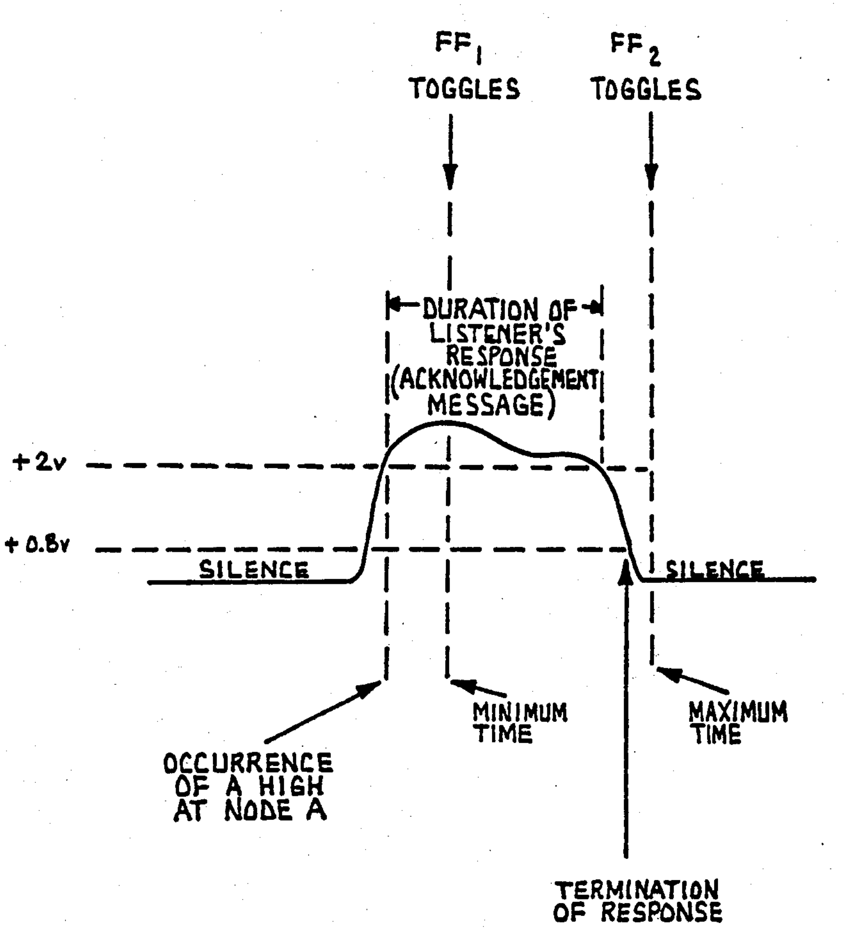
FIG. 8 is a waveform diagram showing an acknowledgement message detectable by the listening circuit of FIG. 7.

As shown in FIG. 7, in the listening circuit 59 this acknowledgement message signal is first rectified by rectifier 97, then filtered by filter 99 to produce a variable DC signal (the variable DC signal being equal in amplitude to the positive amplitude of the signal applied from latch 93). This variable DC signal, measured, for example, at node A, is shown in FIG. 8. The listener's response ("check") corresponds to a high (a signal level greater than 2.0 volts), and the silent periods preceding and following the response each corresponds to a low (a signal level less than 0.8 volts). As shown in FIG. 7, this variable DC signal is applied to NAND gate $G_3$ and to flip-flops $FF_1$ and $FF_2$. This signal is applied to flip-flop $FF_1$ via path 101, via inverter $I_6$ and via inverters $I_6$, $I_5$ and $I_4$. In response to this signal remaining high after a selected minimum time, flip-flop $FF_1$ toggles. This selected minimum time is determined by time constants ($R_3C_2$) and ($(R_4+R_5)C_3$) which provide a time delay (corresponding to the minimum time) in the variable DC signal from node A. The variable DC signal is also applied to flip-flop $FF_2$ via path 101, via inverter $I_6$, and via inverters $I_1$, $I_2$, $I_3$. In response to this signal being low after a selected maximum time, $FF_2$ does not toggle. This selected maximum time is determined by time constants ($R_7C_4$) and ($(R_{10}+R_8)C_5$) which provide a time delay (corresponding to the maximum time) in the variable DC signal from node A.

As shown in FIGS. 7 and 8, if, after a predetermined period of time, the listener's response ends (i.e., goes from a high to a non-high at node A, and becomes less than two volts) at a time (termination time) between the minimum and maximum times (i.e., at a termination time greater than the minimum time but less than the maximum time), an output signal is produced by NAND gate $G_2$ indicating that the listener's response was satisfactory. The predetermined period is selected so as to correspond to the duration of the listener's response (i.e., to the duration of the high at node A). Time constant ($R_{11}C_7$) is selected so that the variable DC signal from node A to NAND gate $G_3$ decays to a level below 0.8 volts so as to indicate the onset of a silence period following the high or acknowledgement period. In response to the decayed variable DC signal, NAND gate $G_3$ applies a high to NAND gate $G_2$.

In response to a high from flip-flop FF1 (indicating that flip-flop FF1 has toggled and that the minimum time has elapsed), to a high from flip-flop FF2 (indicating that flip-flop FF2 has not toggled and that the maximum time has not elapsed), and to a high from NAND gate $G_3$ (indicating the termination of the listener's response occurred between the minimum and maximum times), NAND gate $G_2$ of listening circuit 59 produces an output signal (a high). As shown in FIGS. 3 and 4, this output signal is applied to transmitter 103 (FIG. 3) of transceiver 53, and to power relay 77 of power supply unit 55. (Alternatively, NAND gate $G_2$ may produce a high when termination of the listener's response occurs subsequent to the maximum time.) A high from listening circuit 59 to power relay 77 causes the power relay to turn-off power interface unit 57, listening circuit 59, and CB radio 13 (all shown in FIG. 2), thereby saving power (energy).

In response to a high from listening circuit 59, tone generator 105 (FIG. 3) of transmitter 103 applies a tone signal to phase modulator 107. In response to the applied tone signal and to a reference frequency signal from crystal oscillator 109, phase modulator 107 produces a tone-modulated signal and applies this signal to multiplier chain 111. Multiplier chain 111 produces a frequency-multiplied signal from the applied modulated signal. In response to the frequency-multiplied signal from multiplier chain 111, power amplifier 113 amplifies the frequency-multiplied signal and applies the amplified signal to loop antenna 61 for transmission to the portable alarm unit (FIG. 2). Upon receipt of the transmitted signal, the portable alarm unit generates a vibration which may be felt by the wearer of the unit (e.g., a vibration as produced by the belt unit shown in FIG. 1 of U.S. Pat. No. 3,914,692), the vibration indicating to the user that the emergency message transmitted by him has been received.

In an alternative embodiment, designed merely to inform an individual communicating of the need for assistance by another individual, apparatus 11 may be used in conjunction with the portable alarm unit only (i.e., without a CB radio and without a tape recorder-player). The communicating apparatus 11 would be located in a home, office or car of the would-be-helper, and would include a speaker coupled to tone decoder 75 of receiver 63 (FIG. 3). When an emergency signal is transmitted from the portable alarm unit by the person needing help, the emergency signal would be received by receiver 63, and the resultant tone signal generated by tone decoder 75 of the receiver would cause the speaker to emit an audible tone in response to which the would-be-helper could either himself provide help or call for help via a telephone.

Alternatively, to enable an individual to merely inform another of the need for assistance, tape recorder-player 15 may be used in conjunction with apparatus 11 and with a portable alarm unit (i.e., without a CB radio). Thus, where communicating apparatus 11 and recorder-player 15 are in the possession of a would-be-helper and lead 41 (FIG. 1) is disconnected from the recorder-player, an emergency signal from the portable alarm unit of the person needing help would cause the playing of the emergency message (pre-recorded on tape cassette 51). Upon hearing the emergency message from a speaker of the recorder-player 15 (the message having been made audible as a result of disconnection of lead 41), the would-be-helper would act to provide the requested assistance.

In another embodiment, latches 89 and 93 (FIG. 5) of interface 57 may be linked (via an automatic dialing/answering system) to the receiver and transmitter portions, respectively, of a telephone. In still another communicating embodiment, apparatus 11 may be coupled to a tape player (e.g., to a tape player in an automobile) in addition to a partable recorder-player 15 and to a CB radio 13. For example, communicating apparatus 11 may be connected via leads 25 and 37 (FIG. 1) to the portable recorder-player 15, and a tone and the emergency message may be pre-recorded onto a cassette tape in the portable recorder-player. Thereafter, the portable recorder-player 15 may be disconnected from communicating apparatus 11 and the tape player may be coupled to apparatus 11 via leads 25 and 41. The pre-recorded cassette tape may then be removed from the portable recorder-player 15 and inserted into the tape player, ready for use when a play key is depressed.

Figure 9:
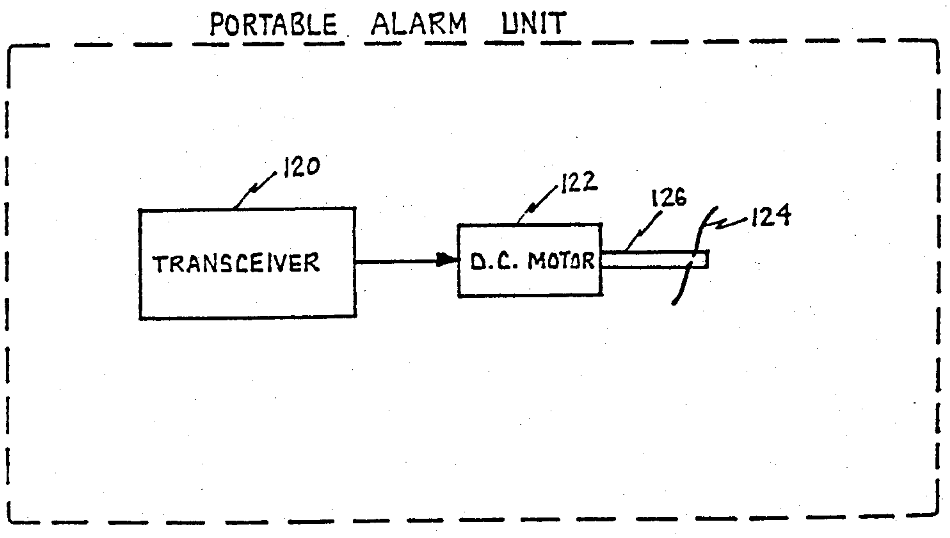
FIG. 9 is a block diagram of an improved portable alarm unit for use with the communicating apparatus of FIGS. 1 and 2.

FIG. 9 shows a portable alarm unit including a transceiver 120 coupled to a DC motor 122 having a string 124 or other flexible element fixedly attached to its shaft 126. When shaft 126 rotates, the flexible element 124 imparts a silent, brushing action to a wearer of the portable alarm unit causing the wearer to experience a harmless brushing sensation (rather than a noisy, often unpleasant sensation provided by a vibrator, for example). The brushing action is performed in response to receipt by transceiver 120 of a signal from transceiver 53 (FIG. 2), informing the wearer of receipt by a listener of his transmitted emergency message.

We claim:

1. In a communication system including a portable unit capable of transmitting a signal, a player unit capable of playing a pre-recorded emergency message, and a CB radio capable of communicating with a listener at a remote CB radio station, an apparatus comprising:

receiver means for producing a signal in response to receiving a signal from the portable unit;

power supply means, coupled to the receiver means and to the CB radio, for receiving the signal produced by the receiver means, providing power, and activating the CB radio;

interface means, coupled to the power supply means, to the CB radio and to the player unit, for activating the player unit to play the emergency message and the CB radio to transmit the emergency message in response to activation by the power supply means, for deactivating the player unit to stop playing the emergency message and the CB radio to stop transmitting the emergency message during a listening period in response to a selected signal from the player unit, and for receiving an acknowledgement signal representing a replay received by the CB radio from the listener; and listening circuit means, coupled to the interface means and to the power supply means, for causing the interface means to deactivate the CB radio to stop transmitting the emergency message in response to receipt during the listening period by the interface means of the acknowledgement signal indicating receipt by the listener of the transmitted emergency message.

2. The apparatus as in claim 1 wherein the power supply means is responsive to a signal from the listening circuit means causing the power supply means to conserve power by deactivating the interface means, the listening circuit means, the CB radio and the player unit upon detection by the listening circuit means of the acknowledgement signal.

3. The apparatus as in claim 2 wherein the acknowledgement signal is specified in the pre-recorded emergency message.

4. The apparatus as in claim 3 wherein the emergency message is pre-recorded on a continuous loop magnetic tape.

5. The apparatus as in claim 4 wherein the selected signal corresponds to a tone recorded over a portion of the length of the continuous loop magnetic tape, the emergency message occupying the remaining length.

6. In a communication system including a portable unit capable of transmitting a signal, a player unit capable of playing a pre-recorded emergency message, and a radio capable of communicating with a listener at a remote station, an apparatus comprising:

receiver means for receiving a signal from the portable unit;

interface means, coupled to the receiver means, to the player unit and to the radio, for causing the emergency message to be transmitted by the radio in response to receipt of the signal from the portable unit by the receiver means, for deactivating the player unit to stop playing the emergency message and the radio to stop transmitting the emergency message in response to a selected signal originating from the player unit, and for receiving an acknowledgement signal representing a reply received by the radio from the listener; and listening circuit means, coupled to the interface means and responsive to receipt of the acknowledgement signal by the interface means, for causing the interface means to deactivate the radio to stop transmitting the emergency message.

7. The apparatus as in claim 6 wherein the radio is a CB radio.

* * * * *